United States Patent [19]

Andrea

[11] Patent Number: 5,533,038
[45] Date of Patent: Jul. 2, 1996

[54] METHOD AND APPARATUS FOR THE RAPID DETECTION AND MEASUREMENT OF DIFFERENTIAL PHASE OFFSET BETWEEN TWO IDENTICAL BINARY CODE SEQUENCES

[75] Inventor: Ralph W. Andrea, Sunnyvale, Calif.

[73] Assignee: GTE Government Systems Corporation, Mountain View, Calif.

[21] Appl. No.: 355,764

[22] Filed: Dec. 14, 1994

[51] Int. Cl.[6] ........................................... G06F 7/02
[52] U.S. Cl. ............................. 371/68.2; 371/67.1
[58] Field of Search ........................ 371/68.2, 67.1; 328/133, 155; 307/511; 324/83 D

[56] References Cited

U.S. PATENT DOCUMENTS

| | | | |
|---|---|---|---|
| 3,728,533 | 4/1973 | Matthews | 235/181 |
| 3,774,206 | 11/1973 | Rauch | 342/89 |
| 3,953,674 | 4/1976 | Fletcher et al. | 375/367 |
| 4,013,969 | 3/1977 | Dennim | 328/155 |
| 4,728,884 | 3/1988 | Gumm | 324/83 D |
| 4,868,512 | 9/1989 | Bridgman | 328/133 |
| 5,014,137 | 5/1991 | Shimada | 358/410 |
| 5,124,656 | 6/1992 | Yassa et al. | 328/155 |
| 5,128,961 | 7/1992 | Ueda et al. | 375/21 |

OTHER PUBLICATIONS

R. B. Ward & K. P. Yiu, "Acquistion of Pseudonoise Signals by Recursion . . . Estimation," *IEEE Trans. on Comm.*, V. COM-25, No. 1, pp. 784–794 (Aug. 1977).

*Primary Examiner*—Hoa T. Nguyen
*Attorney, Agent, or Firm*—J. Stephen Yeo; J. J. Cannon, Jr.

[57] ABSTRACT

A method and apparatus for detecting and measuring the code phase offset in bits and fractional bits, or the time delay in master clock cycles, between a reference binary pseudonoise (PN) code sequence and a similar sequence of unknown delay. Rapid detection and measurement is achieved by utilizing parallel feed-forward logic and eliminating all feedback and variable delay circuitry. At the start of a new detection and measurement cycle, the current state of the A input sequence is stored and correlated with new B input stakes. Likewise the state of the B input sequence is stored and correlated with a new A input code states. After a time equal to the delay between the two input sequences, one of the correlators will produce an output. A time delay counter runs from the start of a new detection and measurement cycle and stops on the occurrence of a correlator output.

8 Claims, 3 Drawing Sheets

METHOD AND APPARATUS FOR THE RAPID DETECTION AND MEASUREMENT OF DIFFERENTIAL PHASE OFFSET BETWEEN TWO IDENTICAL BINARY CODE SEQUENCES

BACKGROUND OF THE INVENTION

1. Field of the Invention

This invention relates to the measurement and identification of the relative time of arrival between two identical error free binary PN code sequences. The measurement technique is further extended to the measurement of the relative time of arrival between two identical binary PN code sequences having a limited number of errors.

2. Description of Prior Art

In the paper "Acquisition of Pseudonoise Signals by Recursion Aided Sequential Estimation," by R. B. Ward and K. P. Yiu, *IEEE Transactions on Communications*, Vol. COM-25, No. 1, August 1977, the authors present a technique for the acquisition of a known direct sequence spread spectrum (DSSS) signal based on sequential estimation. In the prior art of James C. Fletcher (U.S. Pat. No. 3,953,674), an advanced version of the recursion aided sequential estimator is utilized to rapidly acquire the proper PN code sequence generator state without slewing through all intervening states until the correct state (or code phase) is obtained. The techniques of Matthews (U.S. Pat. No. 3,728,533), Rauch (U.S. Pat. No. 3,774,206), and Ueda et al, (U.S. Pat. No. 5,128,961) slew the code phase for correlation using various techniques for the generation of the offset code phase. In the present invention, a parallel correlative technique is used to measure the code phase offset between two code sequences. In the case of DSSS signals, the receiver PN generator is already locked to the incoming signal and the binary code sequence from the receiver PN generator is correlated against a second reference sequence to identify the relative code phase offset between the two sequences.

SUMMARY OF THE INVENTION

In a first aspect of the invention, an apparatus for the rapid detection and measurement of differential phase offset between two identical binary code sequences is provided by utilizing an input latch for resynchronizing the input signals to a master clock, A and B code shift registers for providing serial to parallel conversion of the two input code sequences, A and B code sequence latches for providing storage of the two shift register states at the start of a new measurement cycle, early and late correlators to detect the moment of coincidence of a stored state and the opposite data sequence, an OR gate for the purpose of combining the output of the early and late correlators, latches for storing the early correlator and end of conversion states until the start of a new measurement cycle, a counter for providing a count of the number of counter clock pulses occurring during the current measurement cycle, and a start cycle 1-shot for providing a master clock aligned pulse to start a new measurement cycle.

In a further aspect of the invention, said counter clock input is coupled to either the master clock or to one of the two data clock signals.

In a further aspect of the invention, said start cycle 1-shot is coupled to the said end correlation latch utilizing conditioning logic for the purpose of automatically restarting a new cycle upon completion of the previous cycle.

In another aspect of the invention, said apparatus for the rapid detection and measurement of differential phase offset between two identical binary code sequences is further extended to include a clock phase offset detector for the purpose of measuring the relative phase skew of the resynchronized data clocks of the two input PN sequences. The data clock phase measurement is useful in cases where the two input sequences are clocked at nearly identical data rates.

DETAILED DESCRIPTION OF THE PREFERRED EMBODIMENT

The present invention presents a method and apparatus for the rapid detection and measurement of differential phase offset between two identical binary code sequences. Given two identical error free binary pseudo-noise (PN) sequences that differ only in code phase, the code phase offset detector will determine the skew in code phase (i.e. time of arrival) of the two sequences and the direction of the skew (whether code sequence A leads or follows code sequence B). The time required to perform the phase measurement is equal to the time difference between the two code sequences. Using this technique, the differential code phase can be measured to any resolution and accuracy desired. The method and apparatus of the present invention can be applied to code sequences that are truncated, code hopped, code phase hopped, or rate dithered. Depending on the implementation of the early and late correlators 13 & 16, the present invention can be extended to accept errors in the input PN sequences.

The code phase offset detector can be applied to servo systems where a specific code phase alignment or offset must be accurately maintained. This technique is also well situated for differential timing applications such as distance measurement and time difference of arrival.

Figure 1:
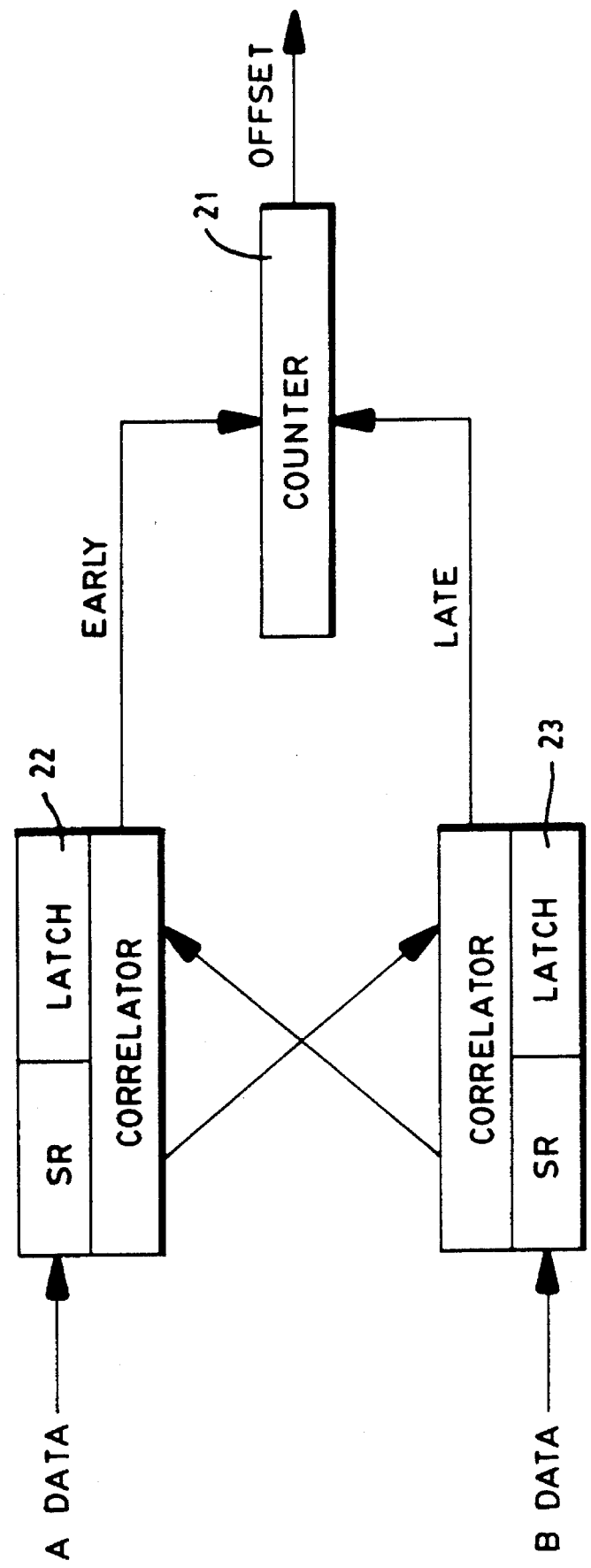
FIG. 1 is the functional block diagram of the preferred embodiment of the code phase offset detector.

The conceptual high level block diagram of the code phase offset detector is shown in FIG. 1. Here, two identical code sequences that differ in their relative time of arrival (code phase) are applied to independently running sequence correlators 22 & 23. The cycle starts when a start strobe is applied which freezes the current state of the two shift registers into their respective latches, and resets the counter 21 to zero (0). As new data is clocked in, each shift register state is compared to the stored state in the opposite latch. When a match is detected, the counter 21 is stopped and the early or late flag is set depending on whether sequence A leads or lags (follows) sequence B.

Figure 2:
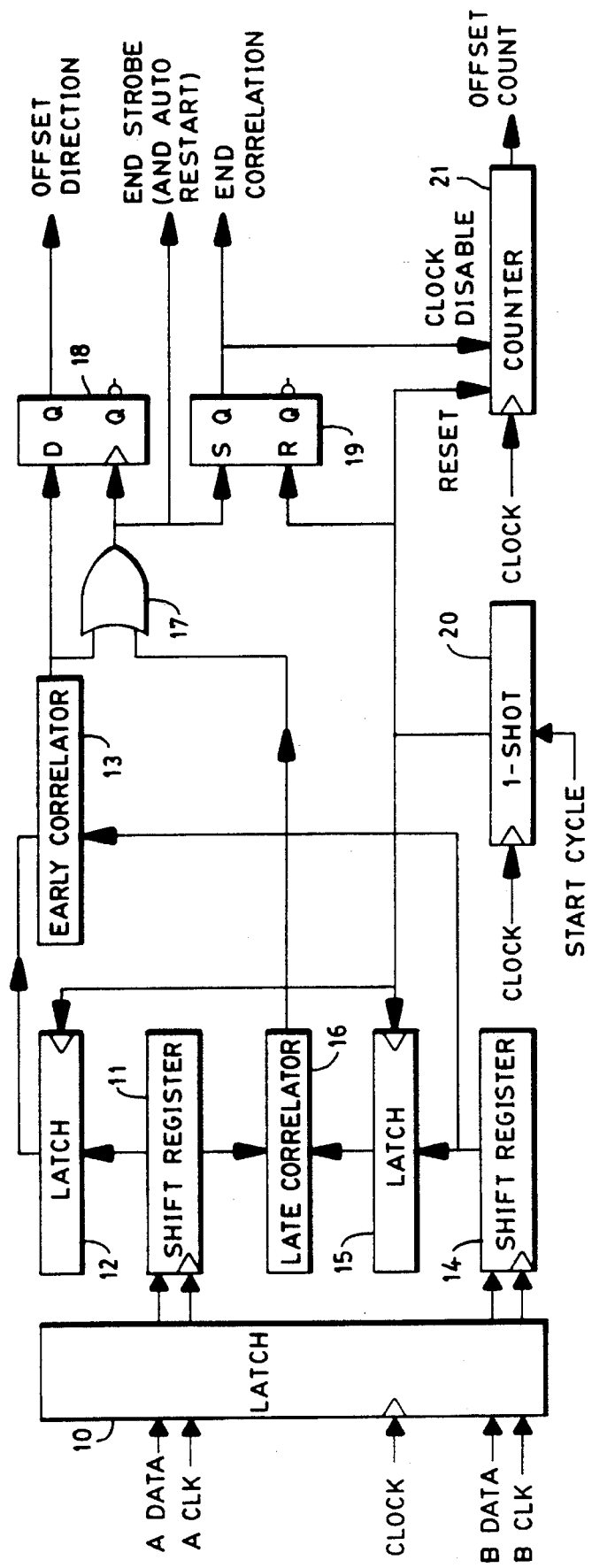
FIG. 2 is the conceptual high level block diagram of the code phase offset detector.

The preferred embodiment of the present invention is presented in FIG. 2. Two input data sequences and their respective clocks are reclocked into the input latch 10 by a master clock, running at more than twice the highest clock rate. This ensures that the internal logic maintains proper setup and hold times in the face of asynchronously changing input lines. Following the input latch are the two shift register/latch/correlator sets 11–13 & 14–16. These correspond to the two state correlators 23 & 24 of FIG. 1. The early correlator 13 compares the A latch 12 with the contents of the B shift register 14, and the late correlator 16 compares the B latch 15 with the contents of the A shift register 12. Thus, if the early correlator 13 detects its code state first, the A sequence leads sequence B. The counter 21 can be clocked by the master clock, sequence A clock, or sequence B clock. Clocking the counter 21 with one of the sequence clocks results in a code phase measurement in bits, whereas use of the master clock results in a phase measurement in clock periods. The later is easily converted to bits and delivers an improved measurement accuracy. The start cycle input, which initiates a measurement cycle, fires a 1-shot 20 to produce a square pulse lasting exactly one clock cycle. The start pulse copies the A shift register 11 and B shift register 14 states into their respective latches 12 & 15, clears the counter 21, and resets the end correlation output latch 19.

Once started, the code phase offset detector will continue to input new data and look for a state match. Once a state match is detected by the early 13 or late 16 correlators (actually implemented as comparators) the counter 21 is stopped, the offset direction is latched into the offset direction latch 18, and the end correlation output latch 19 is set. The end strobe output, which is the logical OR 17 of the outputs of the early 13 and late 16 correlators, will remain active for the duration of the correlation occurrence only. If the automatic restart feature is desired, the falling edge of the end strobe can be delayed one clock cycle, inverted, and applied to the start cycle input of the start cycle 1-shot 20.

If the two sequences are already in step at the time of the start pulse, an end strobe is immediately generated, the counter 21 is stopped at count '0', the offset direction latch 18 is updated, and the end correlation latch 19 is set to '1'. We note that the end correlation latch 19 will have both set and reset inputs active during the start cycle pulse. Assuming that the end correlation latch 19 is designed to give the 'set' input priority and noting that the start cycle pulse will go away first, there will be no problem.

Figure 3:
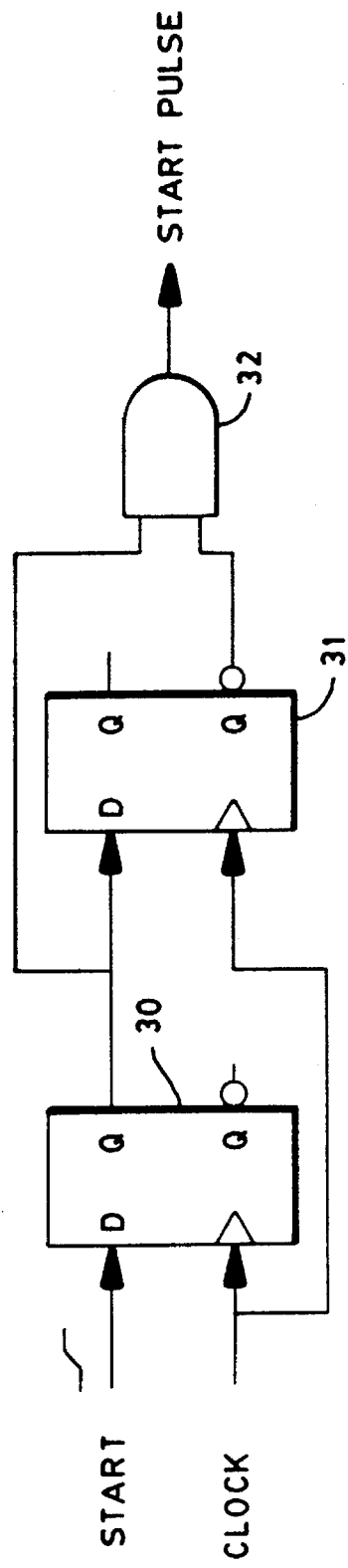
FIG. 3 is the logic diagram of a detail of the preferred embodiment of the code phase offset detector, the start cycle 1-shot functional block.

FIG. 3 depicts an all-digital implementation of a suitable 1-shot circuit 20. The two latches 30 & 31 have different logic levels for one clock cycle following a transition at the start input. The AND gate 32 detects leading edge transitions.

Figure 4:
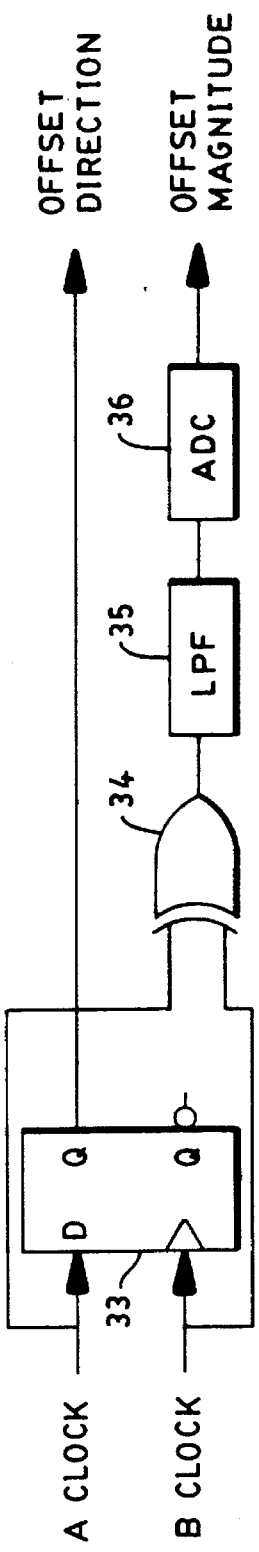
FIG. 4 is the logic diagram of an extension to the preferred embodiment of the code phase offset detector, the clock phase offset detector.

Without sequence clock interpolation, the resolution and accuracy of the code phase measurement is equal to the period of the master clock. Thus, with a 100 MHz master clock, the worst case measurement accuracy is 10 ns, fielding an average accuracy of 5 ns. While a 10 ns resolution may be quite suitable for a 1 Mbps sequence rate, it would be too coarse to measure 40 Mbps sequences. Fortunately, the relative phase shift between the A and B data clocks is readily measured by a variety of analog and digital techniques. An extension to the preferred embodiment for the measurement of data clock phase offset is depicted in FIG. 4. Here the average voltage level at the XOR gate 34 output peaks when the two clocks are aligned and is zero at 180°. The lowpass filter 35 averages the output of the XOR gate 34. The average voltage is digitized utilizing a low cost analog to digital converter (ADC) 36 where the clock phase offset can be read out digitally. The D-FF 33 output is high when A leads B and indicates the direction of the clock phase offset.

What is claimed is:

1. An apparatus for rapidly detecting and measuring the phase offset between A and B identical binary code input data sequences, each data sequence having its respective dock, comprising in combination:

input latch means including a master dock for resynchronizing said A and B input data sequences and their respective clocks by said master clock;

A and B code sequence shift register means for serial-to-parallel converting said A and B input code sequences, respectively, from said input latch means;

A and B code sequence latch means for storing states of said A and B code sequence shift register means at the start of a new detection or measurement cycle;

early correlator means for detecting coincidence of said A code sequence latch with said B code sequence shift register;

late correlator means for detecting coincidence of said B code sequence latch with said A code sequence shift register;

combining means for providing an end conversion strobe in response to an output from either said early correlator means or said late correlator means;

offset direction latch means for storing the output of said early correlator means in response to the end conversion strobe;

end correlation latch means for storing a clear state in response to the start of a new detection and measurement cycle, and storing a set state in response to the end conversion strobe;

counter means for providing a count of the number of counter clock pulses occurring while the said end correlation latch is storing a clear state; said counter means being reset to zero count in response to the start of a new detection and measurement cycle; and start cycle 1-shot means coupled to said A and B code sequence latch means, said end correlation latch means, and said counter means for providing a master clock aligned pulse identifying the start of a new detection and measurement cycle in response to the occurrence of a start cycle command.

2. The apparatus for rapidly detecting and measuring the phase offset between two identical binary code input data sequences of claim 1, wherein a counter means clock input is coupled to the master clock.

3. The apparatus for rapidly detecting and measuring the phase offset between two identical binary code input data sequences of claim 1, wherein said counter means clock input is coupled to the A or B input data sequences clock input signal.

4. The apparatus for rapidly detecting and measuring the phase offset between two identical binary code input data sequences of claim 1, wherein said start cycle 1-shot means is coupled to the said end correlation latch means utilizing conditioning logic for the purpose of automatically restarting a new cycle upon completion of the previous cycle.

5. The apparatus for rapidly detecting and measuring the phase offset between two identical binary code input data sequences of claim 1, wherein said early and late correlators detect complete agreement between the respective bits of the two input words of said A and B data sequences, and comprises in combination:

a plurality of XOR gates, each comparing respective bits of the two input sequences; and AND logic for the purpose of detecting that all of the agreements have occurred.

6. The apparatus for rapidly detecting and measuring the phase offset between two identical binary code input data sequences of claim 1, wherein said early and late correlators compute the number of agreements between respective bits of the two input words and compare the omputed value to a preset threshold, and comprises in combination:

- a plurality of XOR gates, each comparing respective bits of the two input words;
- addition logic for the purpose of computing the number of agreements between respective bits of the two input words; and
- threshold logic for the purpose of detecting that the appropriate number of agreements have occurred.

7. The apparatus for rapidly detecting and measuring the phase offset between two identical binary code input data sequences of claim 1, further including a clock phase offset detector means for the purpose of improving the resolution of the code phase measurement.

8. A method for rapidly detecting and measuring the phase offset between A and B identical binary code input data sequences, said method comprising the steps of:

- inputting A and B identical binary code input data sequences having clock sequences to a code phase offset detector;
- resynchronizing the input data and the clock signals to the master clock;
- providing serial to parallel conversion of segments of the resynchronized A and B input code data sequences respectively;
- storing the state of said A and B code data segments at the start of a new measurement cycle;
- correlating of said stored state of said A code segment with said converted B code segment, and said stored state of said B code segment with said converted A code segment respectively, providing detection of the moment of coincidence;
- combining the occurrence of an output from either an earlier or a later correlating step for providing an end of conversion strobe;
- storing the output from the earlier correlating step at the moment of occurrence of the end of conversion strobe;
- storing a clear state in response to the start of a new detection and measurement cycle and storing s set state in response to end conversion probe;
- counting the number of counter clock pulses occurring during said measurement cycle during said step of storing said clear state, said step of counting including resetting to zero count in response to the start of a new detection and measurement cycle; and
- providing a master clock aligned pulse for the purpose of resetting said code phase offset detector to its initial state and starting a new measurement cycle.

* * * * *